J. F. DAVIS & R. L. FORD.
TRANSMISSION GEARING.
APPLICATION FILED MAR. 9, 1912.
1,079,747.
Patented Nov. 25, 1913.
4 SHEETS—SHEET 2.
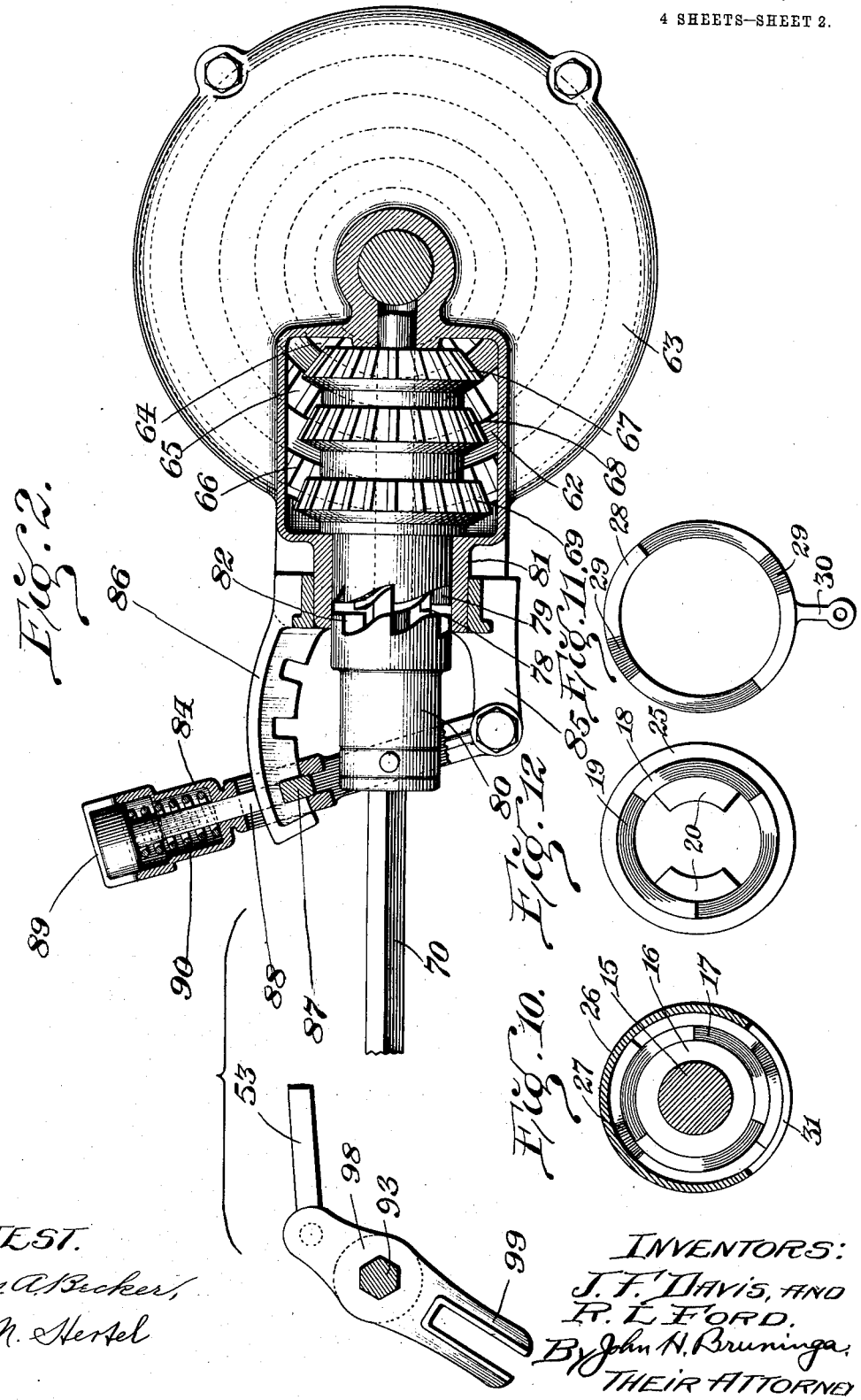
ATTEST.
Chas. A. Becker,
H. M. Hertel
INVENTORS:
J. F. DAVIS, AND
R. L. FORD.
By John H. Bruninga,
THEIR ATTORNEY

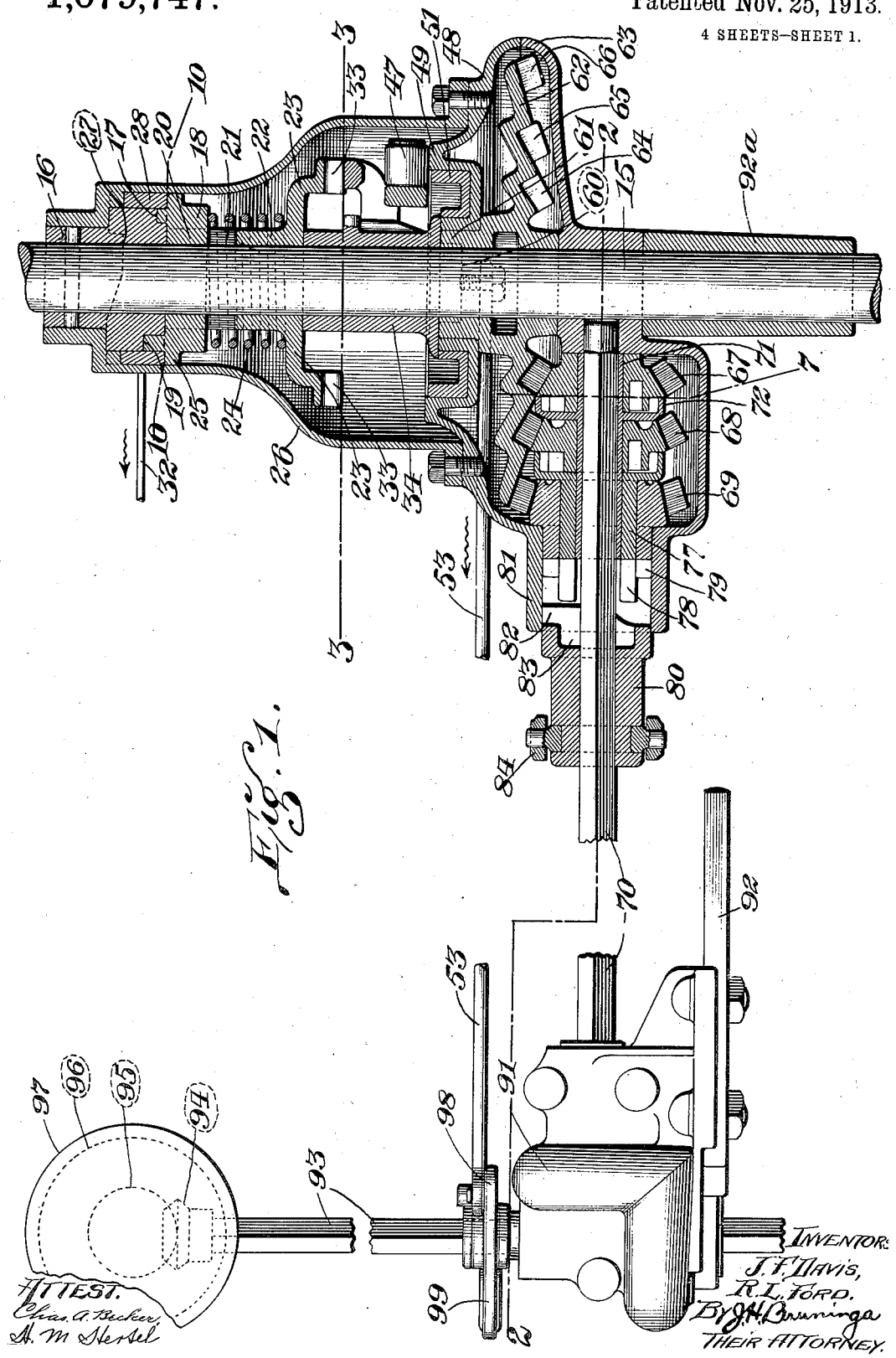

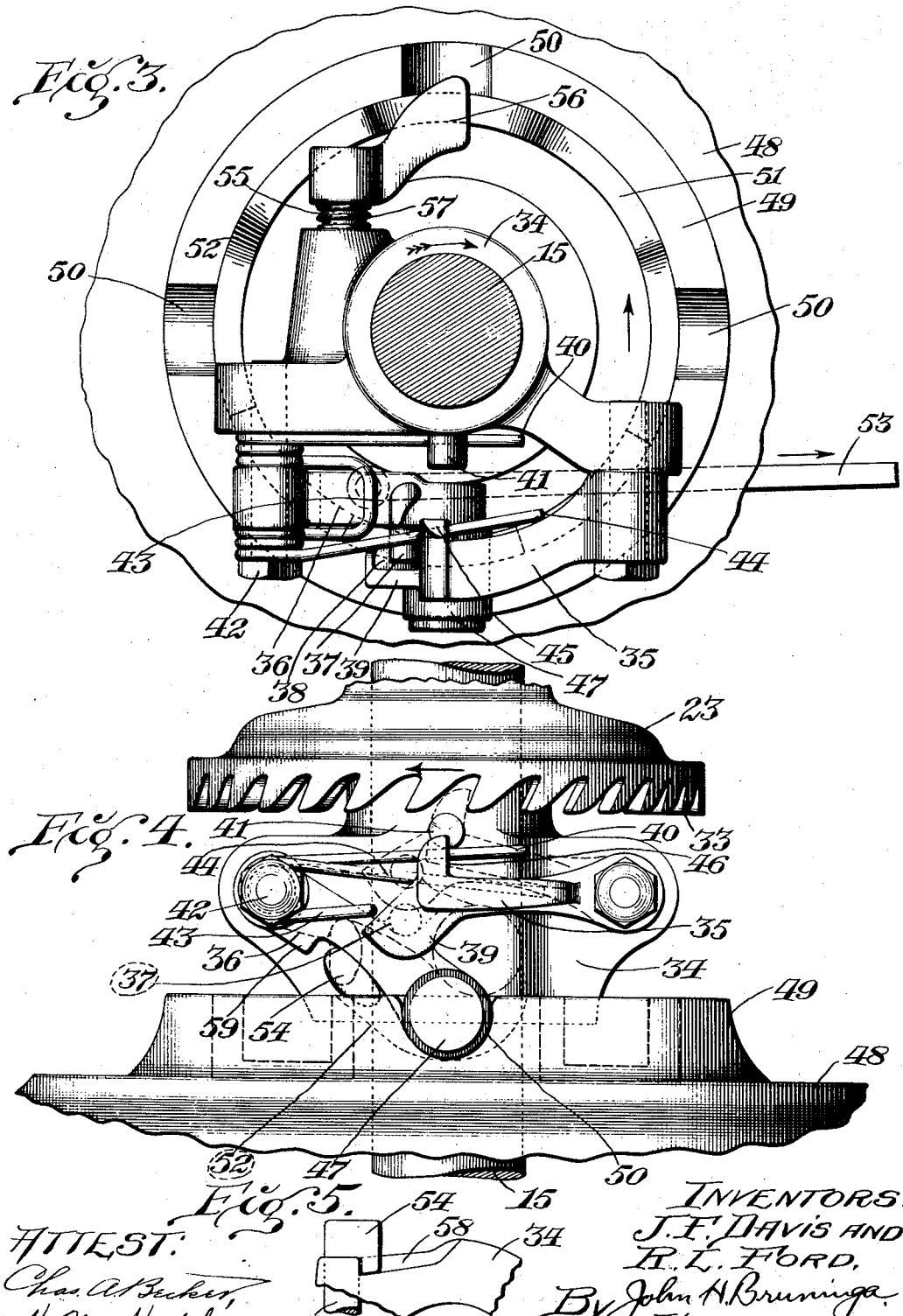

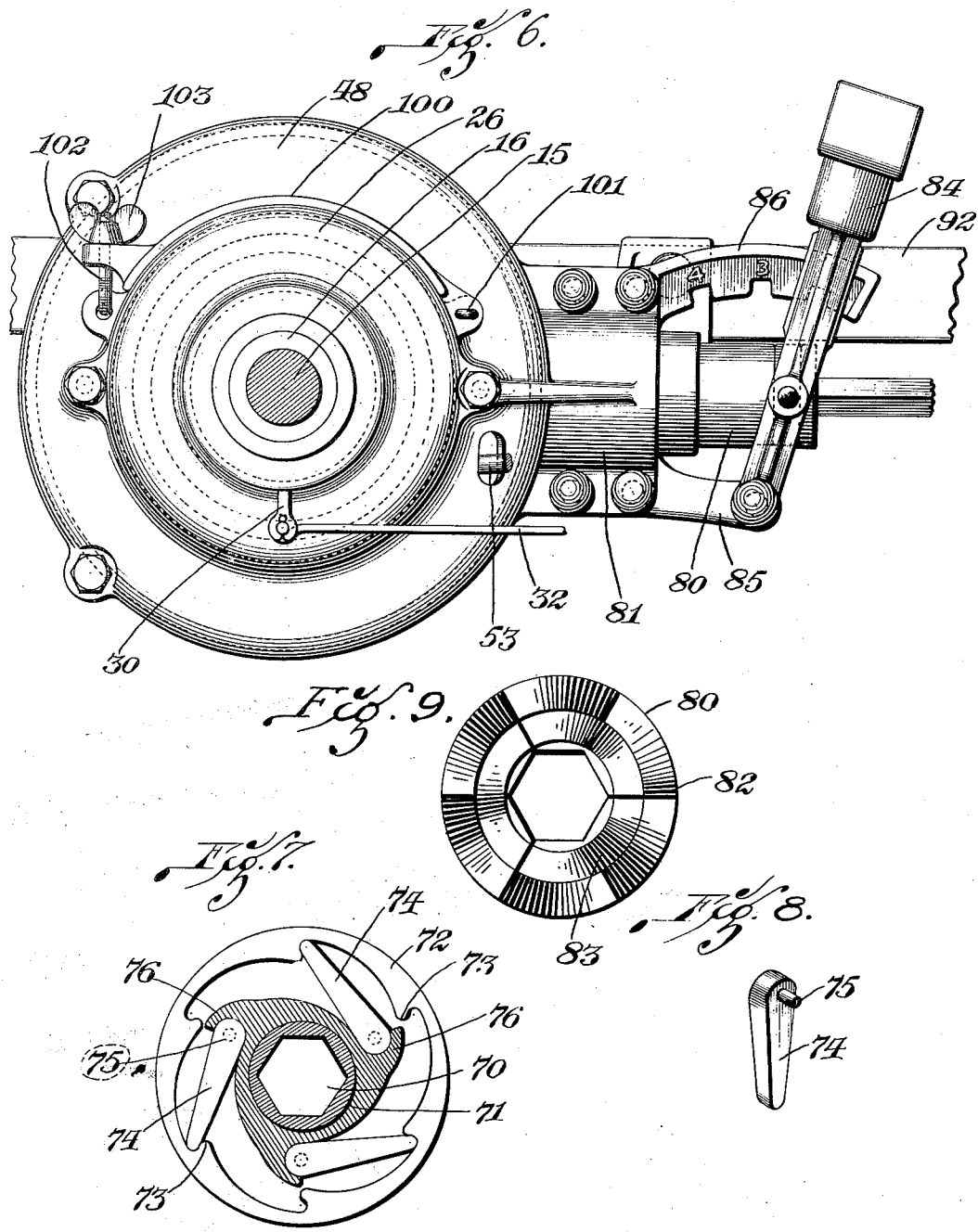

UNITED STATES PATENT OFFICE.

JOHN F. DAVIS AND RALPH L. FORD, OF DECATUR, ILLINOIS, ASSIGNORS TO PIONEER IMPLEMENT COMPANY, OF COUNCIL BLUFFS, IOWA, A CORPORATION OF IOWA.

TRANSMISSION-GEARING.

1,079,747. Specification of Letters Patent. Patented Nov. 25, 1913.

Application filed March 9, 1912. Serial No. 682,776.

*To all whom it may concern:*

Be it known that we, JOHN F. DAVIS and RALPH L. FORD, citizens of the United States, and residing at Decatur, in the county of Macon and State of Illinois, have invented certain new and useful Improvements in Transmission-Gearing, of which the following is a specification.

This invention relates to transmission gearing, and while it is particularly adaptable to corn planters, it is by no means limited to that particular application, since it may be used in automobiles and various other machines where a transmission gearing is useful.

One of the objects of this invention is to construct a transmission gearing by means of which a driven shaft or member can be driven at various speeds, and in which the power can be shifted gradually when changing from a lower to a higher speed and vice versa.

Another object is to construct a variable speed mechanism in which the driving and driven shafts are positioned at an angle, and in which the change of speed can be accomplished without the use of auxiliary gearing.

Another object is to construct transmission gearing in which the driven member can be driven intermittently and at a variable speed, and to arrange this mechanism so that it can be thrown into and out of operation at will.

Another object is to provide novel mechanism for actuating the seed dropping means of a corn planter so that the number of seeds dropped in a hill can be varied at will.

Further objects will appear from the detail description taken in connection with the accompanying drawings in which:

Figure 1 is a plan view partly in section of the transmission gearing forming the subject matter of this invention, Fig. 2 is a section on the line 2—2 Fig. 1, Fig. 3 is a detail section on the line 3—3 Fig. 1 showing the mechanism in elevation, Fig. 4 is a plan of the mechanism shown in Fig. 3, Fig. 5 is a detail of a part of the mechanism shown in Figs. 3 and 4, Fig. 6 is a side elevation of the transmission gearing, Fig. 7 is a section on the line 7—7 Fig. 1, Fig. 8 is a perspective view of one of the pawls, Fig. 9 is a detail face view of the clutch sleeve, Fig. 10 is a section on the line 10—10 Fig. 1, Fig. 11 is a detail showing a clutch actuating member, and Fig. 12 is a detail of a clutch member.

Referring to the accompanying drawings. 15 designates a main driving shaft mounted in suitable bearings (not shown), and having rigidly secured thereto a clutch member 16 provided with jaws 17. A clutch member 18 is loosely mounted upon the shaft 15 and is provided with jaws 19 arranged to engage with the jaws 17. This clutch member is further provided with inwardly extending lugs 20 arranged to take into recesses or slots 21 formed in the hub 22 of a clutch member 23 loosely mounted upon the shaft 15. The clutch member 18 is mounted upon the hub 22 and is slidable thereon toward and from the clutch member 16 to engage and disengage the same, and is normally held in engagement therewith by means of a spring 24 mounted upon the hub 22 and bearing at one end against the clutch member 23 and at the other end against the clutch member 18. The clutch member 18 is provided with a flange 25. The end of a casing section 26 has formed thereon annularly arranged cam lugs 27, and a ring 28 in the casing section is provided with similar cam lugs 29 arranged to coöperate with the cam lugs 27. The ring 28 is mounted for a limited rotatable movement upon the clutch member 16, and bears at one end against the flange 25 on the clutch member 18 and at its other end through its cam lugs 29 against the cam lugs 27. An arm 30 on the ring 28 extends through a slot 31 in the casing 26 and connects with a link 32 operated by a suitable lever (not shown). When the cam lugs 29 are out of engagement with the cam lugs 27, the spring 24 operates to hold the clutch member 18 in engagement with the clutch member 16. When however the link 32 is moved in the direction of the arrow (Fig. 1) so as to rotate the ring 28, then the cam lugs 29 will ride upon the cam lugs 27, causing the ring and the clutch member 18 to be moved endwise against the tension of the spring 24 to disengage the clutch members 18 and 16. When the cam lugs 29 are on the high or level portion of the cam lugs 27, the clutch members are maintained out of engagement.

The clutch member 23 is provided with beveled teeth 33. A clutch member 34 is loosely mounted upon the shaft 16 and has pivotally mounted thereon a pair of levers 35 and 36. A pin 37 on the lever 36 engages with a track 38 formed in a lug 39 on the lever 35. A spring has one end 40 thereof bearing against a lug 41 on the clutch member 34, is passed around the pivot pin 42 for the lever 36, around this lever as shown at 43, around the pin 42, and has its other end 44 bearing against a lug 45 on the lever 35. The lever 35 is provided with a tooth 46 adapted to engage the teeth 33 on the clutch member 23.

The lever 36 is provided with a cam roll 47, and a casing section 48 is provided with a ring-shaped projection 49 having a plurality of recesses 50 spaced in this case one-fourth of a revolution or 90° apart. When the cam roll 47 is opposite one of the recesses 50, the spring will operate to force this cam roll into the recess and move the levers to full line position, Figs. 3 and 4, with the tooth 46 out of engagement with the teeth 33. A ring 51 is mounted in the casing 48 and is provided with recesses forming cam portions 52. This ring is connected with a link 53 arranged to be reciprocated in a manner hereinafter to be described.

The clutch member 23 is connected to move with the shaft 15 through the clutch members 16 and 18 while the clutch member 34 is loosely mounted upon the shaft. When the ring 51 is in the position shown in full lines Figs. 3 and 4, the cam roll 47 will be in one of the recesses 50 and the tooth 46 will be held out of engagement with the teeth 33 so that the clutch members 23 and 34 are held disengaged by the spring. Movement of the link 53 in the direction of the arrow Figs. 1 and 3 will cause the ring 51 to be moved in the direction of the arrow Fig. 3. This will cause one of the cam portions 52 to bear against the cam roll 47 and raise it out of the recesses 50. This will operate to move the levers 35 and 36 to dotted position Fig. 4, and move the tooth 46 into engagement with one of the teeth 33 and thereby connect the clutch members 23 and 34 as shown in Figs. 1 and 4. The clutch member 23 moving in the direction of the arrow (Fig. 4) will thus carry the clutch member 34 with it, but as soon as the cam roll 47 has left its recess 50 and rides upon the ring 49, the ring 51 is moved back to the position shown in Figs. 3 and 4, so that when the cam roll reaches the next recess 50 it will snap therein under the tension of the spring and move the parts to the position shown in full lines Figs. 3 and 4, thereby moving the tooth 46 out of engagement with the teeth 33 and disconnecting the clutch members. The recesses 50 operate not only to disconnect the clutch members, but they also form a positive stop for positively arresting the rotation of the clutch member 34 and the parts connected therewith. The ring 51 is operated automatically by mechanism hereinafter to be described to intermittently move the clutch members into engagement, and the ring is moved back automatically before the cam roll 47 reaches the next recess 50. The clutch members are therefore automatically moved out of engagement after a quarter of a revolution of the main driving shaft 15. It will be noted that the clutch members are arranged to engage in any relative position of said members.

Means are provided for manually throwing the clutch members 23 and 34 into engagement and latching them in engagement. A cam lug 54 is mounted upon a shaft 55 in the clutch member 34 which is provided with an operating handle 56. The shaft 55 is movable endwise, and a spring 57 is mounted on the shaft and bears at one end against the hub of the handle 56 and at its other end against the clutch member 34. The clutch member is provided with an inclined portion 58 against which the lower end of the lug 54 bears. By rotating the shaft 55 counter clockwise Fig. 4, the cam lug 54 will bear against the lever 36 and move it to dotted position Fig. 4. The cam lug 54 engages a stop 59 which limits its movement. As the shaft 55 is rotated the end of the cam lug 54 will ride up on the incline 58, thus compressing the spring 57 so that when the cam lug comes into engagement with the stop 59 and with the cam lug 54 on the rise or level portion of the cam 58, the spring 57 will operate to hold the cam lug in dotted position. This spring will also operate to hold the shaft 55 and the cam lug in full line position. The above mechanism forms means for manually throwing the clutch members into engagement and latching them in that position.

The clutch member 34 is provided with jaws 60 engaging coöperating jaws 61 on the hub of a gear 62 loosely mounted upon the shaft 15 between the casing sections 48 and 63. The gear 62 is provided with three sets of bevel gear teeth 64, 65 and 66 meshing with three bevel pinions 67, 68 and 69 respectively, mounted upon a driven shaft 70 which is angular in cross section as shown. The pinions are arranged to be clutched to their shaft 70, and the clutching means between the pinions 67 and 68 and the shaft 70 is operative in one direction only as hereinafter described. A sleeve 71 is mounted upon the shaft 70 so as to move therewith as shown in Figs. 1 and 7. This sleeve is provided with a flange 72 projecting over the hub of the pinion 67 and provided with inwardly facing ratchet teeth 73. The hub of the pinion 67 has mounted thereon a plurality of pawls 74 adapted to engage the ratchet teeth 73. These pawls are provided with pintles 75 engaging bearings in the pinion hub and the pinion hub is extended around the pawls as shown at 76 so as to take up the thrust thereof. A second sleeve 77 is loosely mounted upon the sleeve 71. This sleeve 77 is similar in its construction to the sleeve 71 and has a similar connection to its pinion 68. It is however provided with clutch jaws 78. The pinion 69 is loosely mounted upon the sleeve 77 and its hub is provided with clutch jaws 79 similar to the jaws 78. The jaws 78 however extend beyond the jaws 79.

A clutch sleeve 80 is splined to the shaft 70 and works in the portion 81 of the casing. This clutch sleeve is provided with clutch jaws 82 arranged to coöperate with the jaws 78 and 79 connected with the pinions 68 and 69 respectively. The inside portions of the jaws 82 however extend inwardly as shown at 83 Fig. 9.

The clutch sleeve is arranged to be operated by a foot lever 84 pivoted upon a bracket 85 formed on the casing and moving over a notched rack 86. A sliding bolt 87 is mounted in this lever and is arranged to engage the notches in the rack. The shank 88 of this bolt is provided with an enlarged head 89 and has mounted thereon a spring 90 bearing at one end against the head 89 and at its other end against the lever body. The lever is operated by placing the foot upon the head 89 so as to depress the same to release the bolt 87 from the notch, when the lever can be moved over the rack.

When the lever 84 is in the position shown in Figs. 2 and 6, the clutch sleeve 80 will be entirely disengaged from the sleeve 77 and the hub of the pinion 69. Since the sleeve 71 is however constantly connected to the shaft 70, the driving and driven shafts will be connected through the gears 62 and 67 to drive the driven shaft at its lowest speed. By moving the lever 84 to the position "3" (Fig. 6), the jaws on the clutch sleeve 80 will engage the jaws 78 on the sleeve 77 so as to connect this sleeve 77 with the driven shaft 70. The driving and driven shafts will now be connected through the gears 62 and 68, and the driven shaft will be driven at an intermediate speed as determined by the gear ratio of these gears. Since the driven shaft will now be moved faster than the pinion 67, this pinion will slip backward on the shaft, but it is enabled to do this on account of the pawl and ratchet connection between the pinion 67 and the driven shaft. When the lever 84 is moved to the position "4" the clutch jaws 82 will engage with the jaws 79 on the hub of the pinion 69 so that this pinion will be directly connected to the driven shaft. The teeth 78 are made long enough, and the inside portions 83 of the teeth are cut under as shown in Fig. 9, so as to permit this sliding movement of the clutch sleeve. The driving and driven shafts will now be connected through the gears 62 and 69 and these shafts will therefore be driven at the highest speed as determined by the gear ratios. Both pinions 67 and 68 will now slip backward on the driven shaft 70.

The driving shaft will drive the driven shaft at three different speeds by a direct drive. This is accomplished without the use of auxiliary mechanism, but by a direct bevel gear drive. The change from one speed to another is accomplished without disconnecting the gear of the next higher or lower speed from the driven shaft, but both gears are connected to the driven shaft at the time of transfer of power from one to the other. The transfer of power is therefore gradual, resulting in smooth operation, and obviating jerks and shocks as is the case where one gear is entirely disconnected before the connection is made to the next gear of the succeeding speed. The gears are thrown into operation successively and progressively by a progressive movement of a single clutch sleeve. The mechanism is so constructed that the driving and driven shafts are connected at all times through the low speed gears. This is advantageous in some types of machines as will hereinafter appear.

A casing 91 is bolted to a bar 92 which is also bolted to the casings and to a sleeve 92ª upon the driving shaft 15. A shaft 93 passes through the casing 91 and has an operative driving connection with the shaft 70 through a pair of bevel gears (not shown) The bar 92 forms means for spacing the shafts 15 and 93 and for bracing the mechanism thereon.

The transmission mechanism is particularly adapted for operating the seed dropping means of a corn planter. When used in such a relation the shaft 15 is connected with the wheels of the planter and is driven thereby, and the shaft 93 forms the seed dropper actuating shaft. In Fig. 1 the shaft 93 has mounted thereon a bevel gear 94 meshing with a bevel gear 95 connected to and operating a rotary seed plate 96 supported in the seed box or hopper 97. It will be understood that there is a similar seed box and similar mechanism on the other side of the machine.

The link 53 is connected to one end of a lever 98 mounted to oscillate upon the casing 91 and provided with a fork 99. This fork is operated from check-row mechanism (not shown) of usual construction. The link 53 will thus be operated intermittently by the check-row mechanism so as to intermittently and automatically move the clutch members 23 and 24 into and out of engagement.

In the operation of the machine as a corn planter the check-row mechanism will operate to intermittently engage and disengage the clutch members 23 and 34. After each operation through the check-row mechanism, the clutch members will be engaged for a quarter of a revolution of the drive shaft 15, so as to intermittently rotate the shaft 70 and the seed plate 96 for a predetermined distance. It is desirable however to vary the movement of the seed plate so as to vary the number of seeds dropped to a hill. This is accomplished by the variable speed mechanism described above. Thus when the lever 84 is in the position shown in Fig. 6 or in its low speed position the seed plate will be rotated through the shortest distance and will drop the smallest number of seeds to a hill, (take as an example two seeds to a hill). By moving the lever to its next position " 3 " Fig. 6, the seed plate will be moved through a greater distance for each actuation of the check-row mechanism so as to drop for example three seeds to a hill.
Similarly for the highest speed position " 4 ". It is sometimes desirable to operate the seed plate continuously as when drilling. This is accomplished by throwing the clutch members 23 and 34 into engagement by means of the cam lug 54. The casing is for this purpose provided with a door 100 hinged at 101 and positioned over the handle 56 so that by opening the door the handle 56 will be accessible for operation. The door is latched in position by a swinging bolt 102 and a wing nut 103. The clutch member 23 can be thrown out of operation entirely by means of the link 32 and its mechanism; this is desired when the planter is to be moved from place to place.

It is obvious that various changes may be made in the details of construction without departing from this invention, and it is therefore to be understood that this invention is not to be limited to the specific construction shown and described.

Having thus described the invention what is claimed is:

1. In transmission gearing, the combination with driving and driven shafts positioned in angular relation, of a bevel gear having a plurality of sets of teeth and mounted on one of said shafts, a set of bevel pinions on the other of said shafts meshing with the teeth on said first gear, and means for successively clutching said pinions with their shaft, said clutching means including a clutching device operative in one direction only between one of said pinions and their shaft and means for rendering said clutching device operative to connect its pinion to its shaft.

2. In transmission gearing, the combination of driving and driven shafts positioned in angular relation, a gear having a plurality of sets of teeth and mounted on one of said shafts, a set of bevel pinions on the other of said shafts meshing with the teeth on the gear on the first shaft, individual clutching devices operative in one direction only for said pinions, and means on said second shaft for successively rendering said clutching devices operative to successively connect said pinions to their shaft.

3. In transmission gearing, the combination of driving and driven shafts, gearing on one of said shafts, a set of gears on the other of said shafts meshing with said gearing on the first shaft, a sleeve on the second shaft connected with one of said gears thereon, a second sleeve in nested relation with respect to said first sleeve, means operative in one direction only for connecting said second sleeve with another gear on said second shaft, and means including a member movable with and on said second shaft for connecting said sleeves with said second shaft.

4. In transmission gearing, the combination of driving and driven shafts, gearing on one of said shafts, a set of gears on the other of said shafts meshing with said gearing on the first shaft, clutch engaging members connected with the gears on the second shaft, one of the connections being made through means operative in one direction only, and a clutch sleeve on the second shaft having means adapted to engage said clutch engaging members and connect said gears with said second shaft.

5. In transmission gearing, the combination of driving and driven shafts, gearing on one of said shafts, a set of gears on the other of said shafts meshing with said gearing on the first shaft, clutch engaging members connected with the gears on the second shaft, one of the connections being made through means operative in one direction only, and a clutch sleeve on the second shaft having means adapted to successively engage said clutch engaging members, said clutch sleeve maintaining its engagement with one of said clutch engaging members while engaging another of said clutch engaging members.

6. In transmission gearing, the combination of driving and driven shafts, gearing on one of said shafts, a set of gears on the other of said shafts meshing with said gearing on the first shaft, a sleeve on the second shaft connected with one of said gears thereon, a second sleeve in nested relation with respect to said first sleeve, means operative in one direction only for connecting said second sleeve with another gear on said second shaft, and a clutch sleeve on the second shaft having means adapted to engage said sleeves to connect said gears with said second shaft.

7. In transmission gearing, the combination of driving and driven shafts, gearing on one of said shafts, a set of gears on the other of said shafts meshing with the gearing on the first shaft, devices operative in one direction only connected to certain of said gears, means for directly connecting one of said devices to said second shaft, and means for clutching another of said devices with said second shaft, to cause said driving shaft to drive said driven shaft at different speeds.

8. In transmission gearing, the combination of driving and driven shafts, gearing on one of said shafts, a set of gears on the other of said shafts meshing with the gearing on the first shaft, devices operative in one direction only connected to certain of the gears on said second shaft, and means for clutching one of said devices to said second shaft and for directly connecting another gear on said second shaft thereto.

9. In transmission gearing, the combination of driving and driven shafts, gearing on one of said shafts, a set of gears on the the other of said shafts meshing with the gearing on the first shaft, devices operative in one direction only connected to certain of the gears on said second shaft, means for permanently connecting one of said devices to said second shaft, and means for clutching one of said devices to said second shaft and for directly connecting another gear on said second shaft thereto.

10. In transmission gearing, the combination with driving and driven shafts, of a bevel gear on one of said shafts, a set of bevel pinions on the other of said shafts meshing with said first gear, and clutching means coöperating with said pinions to clutch one of said pinions directly and clutch another of said pinions indirectly with one of said shafts, the connection of said clutching means to the second pinion being constructed to permit the second pinion to slip when the first gear is clutched to the shaft.

11. In transmission gearing, the combination with driving and driven shafts, of gearing connected to one of said shafts, a clutch, together with automatic controlling mechanism therefor constructed and arranged to intermittently connect said gearing with the other of said shafts, and means for rendering said clutch operative to constantly connect said gearing with said shaft.

12. In transmission gearing, the combination with driving and driven shafts, of gearing connected to one of said shafts, a clutch, together with automatic controlling mechanism therefor constructed and arranged to intermittently connect said gearing with the other of said shafts, means for rendering said clutch operative to constantly connect said gearing with said shaft, and means for connecting and disconnecting said clutch to and from its shaft.

In testimony whereof we affix our signatures in presence of two witnesses.

JOHN F. DAVIS.
RALPH L. FORD.

Witnesses:
A. M. WIDICK,
W. M. BERING.